(12) United States Patent
Pace et al.

(10) Patent No.: US 8,170,413 B2
(45) Date of Patent: May 1, 2012

(54) SINGLE SEAT-KILL CAMERA SYSTEM

(75) Inventors: Vincent Pace, Shadow Hills, CA (US); Patrick Campbell, Stevenson Ranch, CA (US)

(73) Assignees: James Cameron, Burbank, CA (US); Vincent Pace, Burbank, CA (US)

( * ) Notice: Subject to any disclaimer, the term of this patent is extended or adjusted under 35 U.S.C. 154(b) by 84 days.

(21) Appl. No.: 12/752,091

(22) Filed: Mar. 31, 2010

(65) Prior Publication Data

US 2011/0243546 A1    Oct. 6, 2011

(51) Int. Cl.
   *G03B 35/00* (2006.01)
   *G03B 17/00* (2006.01)
(52) U.S. Cl. .................. 396/329; 396/428
(58) Field of Classification Search .......... 396/419, 396/427, 428, 322, 329; 348/157, 169, 373; 248/125.1
See application file for complete search history.

(56) References Cited

U.S. PATENT DOCUMENTS

| | | | |
|---|---|---|---|
| 4,155,100 A | 5/1979 | Hill, Jr. | |
| 4,811,093 A | 3/1989 | Giacometti | |
| 5,786,854 A * | 7/1998 | Slade et al. | 348/373 |
| 6,326,994 B1 | 12/2001 | Yoshimatsu | |
| 7,126,461 B2 * | 10/2006 | Takeichi et al. | 340/435 |
| 7,190,389 B1 | 3/2007 | Abe et al. | |
| 7,193,645 B1 | 3/2007 | Aagaard | |
| 7,527,439 B1 | 5/2009 | Dumm | |
| 2005/0007553 A1 | 1/2005 | Romanoff et al. | |
| 2008/0129825 A1 | 6/2008 | DeAngelis et al. | |
| 2008/0226284 A1 | 9/2008 | Coppola | |
| 2010/0026809 A1 | 2/2010 | Curry | |

OTHER PUBLICATIONS

World Intellectual Property Organization, International Search Report and Written Opinion for International Application No. PCT/US2011/030815, mail date Jul. 5, 2011, pp. 1-9.

* cited by examiner

*Primary Examiner* — W. B. Perkey
*Assistant Examiner* — Minh Phan
(74) *Attorney, Agent, or Firm* — SoCal IP Law Group LLP; John E. Gunther; Steven C. Sereboff

(57) ABSTRACT

There is disclosed a single seat-kill camera system and method. The single seat-kill camera may include a camera head and an elevator configured to position the camera head in one of a down position and an up position. An obstruction detector may determine whether or not a field of view of the camera head is obstructed, at least in part, when the camera head is in the down position. A controller coupled to the elevator and the obstruction detector may automatically instruct the elevator to position the camera head in the up position when the obstruction detector determines that the field of view of the camera head in the down position is obstructed.

20 Claims, 8 Drawing Sheets

SINGLE SEAT-KILL CAMERA SYSTEM

BACKGROUND

1. Field

This disclosure relates to cameras for recording events in a stadium, arena, or theater environment.

2. Description of the Related Art

Sporting events and theatrical productions may be performed before live audiences in venues such as stadiums, arenas, and theaters. Such events may be recorded by one or more film or video cameras that are typically located outside of the seating regions of the venue. However, a camera located outside of the seating regions cannot reproduce the view of a fan or spectator within the venue.

To provide a more realistic fan's perspective of an event, a camera may be placed within a seating region of the venue. A remotely operated camera may occupy only a single seat location. However, a camera mounted at the height of a seated spectator may not be useful when spectators in front of the camera stand, which typically occurs at the most exciting portions of the event. Alternatively, as shown in FIG. 1A, a camera 122 located within a seating region may be mounted on a support structure 142 that elevates the camera 122 to a sufficient height such that a line of sight 125 of the camera passes above spectators, such as spectator 102, standing in front of the camera position. Unfortunately, when a camera is elevated to see over standing spectators, the camera 122 and support structure 142 will partially obstruct lines of sight 105, 107, 109 of spectators 104, 106, 108 seated behind the camera.

FIG. 1B shows a schematic top view of a camera 122 disposed in a seating region 110 of a venue. When the camera 122 is supported at a sufficient height to see over a standing spectator, the camera 122 and the associated support structure may partially obstruct the view of spectators seated (obstructed seats 112 are shown shaded in FIG. 1B) directly behind and to the left and right of the camera position. Since the obstructed seats may not be salable or may be sold only at a reduced price, placing a camera in a seating region is commonly said to "kill" a number of seats. The number of seats that are obstructed by the camera 122 may be defined, in part, by the lines of sight 126, 127 from the camera 122 (and the spectators seated behind the camera) to the extremes of the camera's field of regard, such as a court, playing field, or stage where the event being captured occurs. In the example of FIG. 1B, 15 seats are at least partially obstructed by the camera 122. The number of obstructed seats may be more or fewer than 15.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

In this patent, the term "data" is intended to include digital data, commands, instructions, digital signals, analog signals, optical signals and any other format for communicating quantitative or qualitative information. The term "automatically" means "without operator involvement".

The term "capture" means to convert a portion of a scene into data which may be, for example, recorded or transmitted. The term "line of sight" means a line connecting a viewer and an object to be viewed; when applied to a camera, the "line of sight' is synonymous with the optical axis of the camera. The term "pan angle" has the usual meaning of a rotation angle in a horizontal plane between a line of sight of a camera and a predetermined datum. The term "tilt angle" has the usual meaning of a rotation angle in a vertical plane between a line of sight of a camera and a horizontal plane.

The term "field of view" means a portion of scene captured by a camera at any given instant. The field of view is defined, in part, by the pan and tilt angles and the focal length of a lens or lenses within the camera. The field of view is centered upon the line of sight of the camera. The term "field of regard" means the entire extent of the scene that may be captured by a camera or viewed by a spectator. For example, when a camera is used to capture an athletic event or performance, the field of regard may be an entire playing field or court where the athletic event occurs or an entire stage where the performance occurs.

In this patent, the term "mechanism" refers to a combination of mechanical, electrical, and electromechanical components, including at least one component movable with respect to other components, and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses.

Figures 1A, 1B:
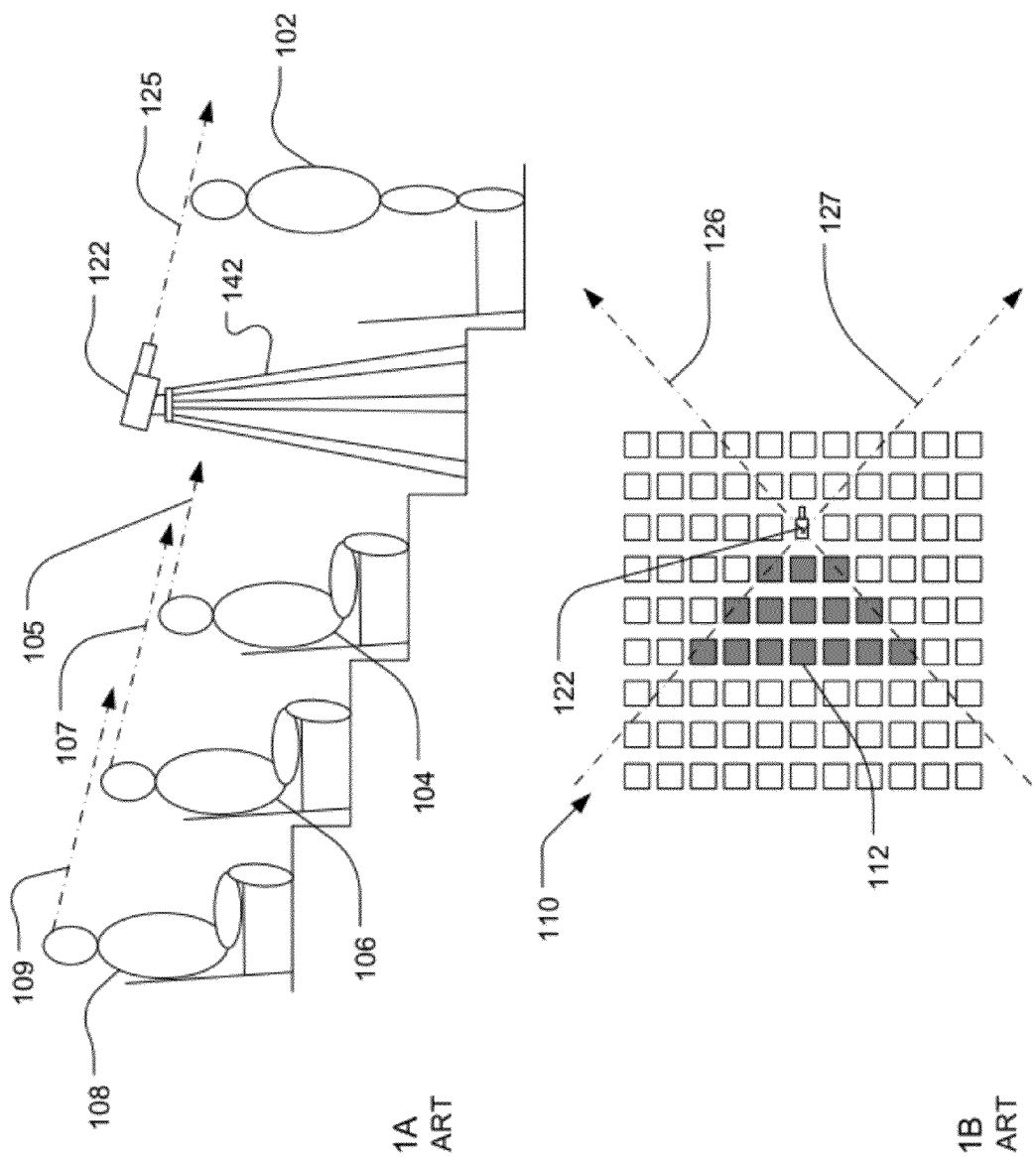
FIG. 1A is a schematic side view of a conventional camera in a seating region of a venue.
FIG. 1B is a schematic top view of a conventional camera in a seating region of a venue.
Figure 2A:
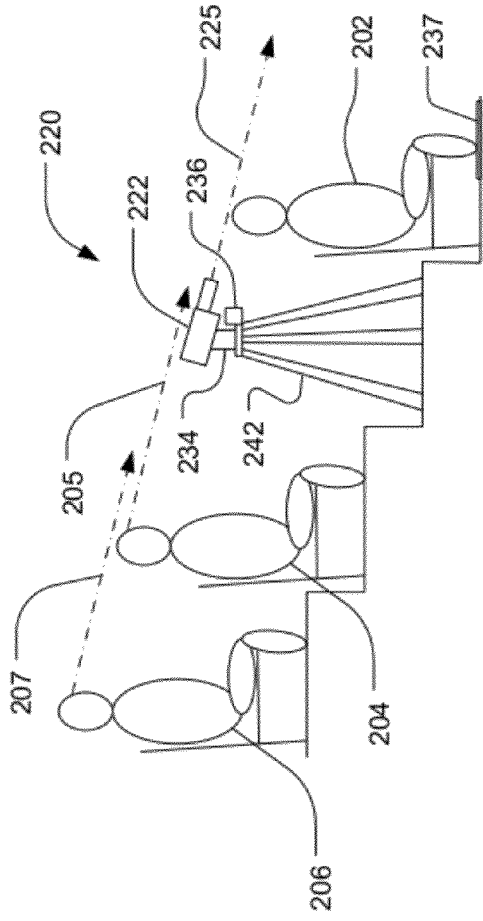
FIG. 2A is a schematic side view of a single seat-kill camera in a seating region of a venue.
Figure 2B:
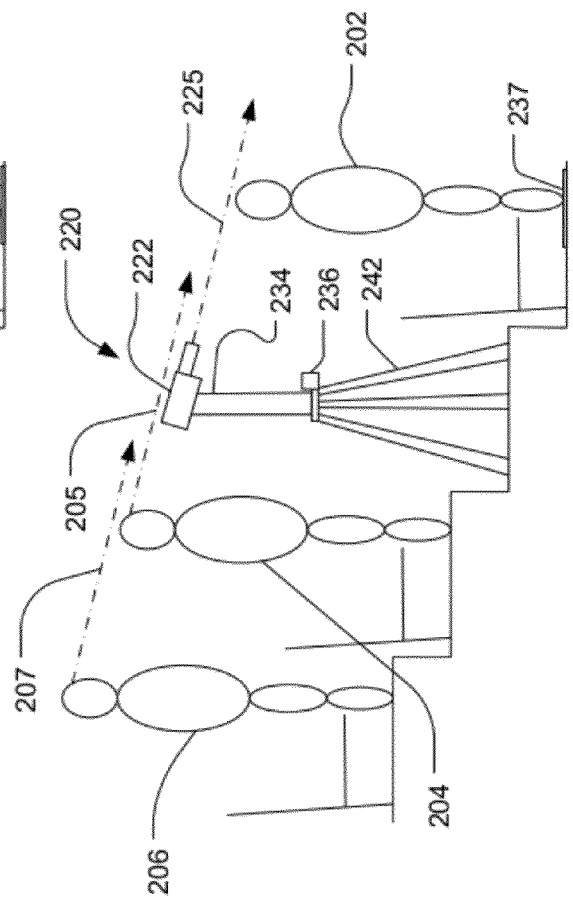
FIG. 2B is another schematic side view of the single seat-kill camera in a seating region of a venue.

Referring now to FIG. 2A and FIG. 2B, a single seat-kill camera system 220 may be disposed in a seating area of a venue. A "single seat-kill camera" is defined to be a camera that occupies a single seat location and does not significantly obstruct the view of spectators occupying adjacent seats. The single seat-kill camera system 220 may include a camera 222, a supporting structure 242, and an elevator 234 configured to shift the position of the camera 222 vertically between at least a down position (as shown in FIG. 2A) and an up position (as shown in FIG. 2B). While the supporting structure 242 is shown schematically as a tripod, the supporting structure 242 may have some other physical form.

When the elevator 234 is in the down position as shown in FIG. 2A, the camera 222 may be supported at a height approximately equivalent to the head position of a seated spectator. When the elevator 234 is in the down position, a line of sight 225 of the camera 222 may pass over the heads of one or more spectators 202 seated in front of the camera. Additionally, when the elevator 234 is in the down position, the camera 222 may not substantially obstruct the lines of sight 205, 207 of spectators 204, 206 seated behind the camera.

When the elevator 234 is in the up position as shown in FIG. 2B, the camera 222 may be supported at a height approximately equivalent to the head position of a standing spectator. When the elevator 234 is in the up position, the line of sight 225 of the camera 222 may pass over the heads one or more spectators 202 standing in front of the camera. Additionally, when the elevator 234 is in the up position, the camera 222 may not substantially obstruct the lines of sight 205, 207 of spectators 204, 206 behind the camera, so long as the spectators 204, 206 also stand up.

The single seat-kill camera system 220 may include or be coupled to an obstruction detector to determine whether or not persons or other objects in front of the camera 222 would obstruct the line of sight 225 of the camera in the down position. For example, the obstruction detector may be or include at least one distance sensors 236 configured to determine a distance from the distance sensor 236 to a nearest object within a field of view of the distance sensor. The at least one distance sensor 236 may be mounted to the supporting structure 242 and/or the elevator 236. The field of view of the at least one distance sensor 236 may be similar to, or slightly larger than, a field of view of the camera 222. The at least one distance sensor 236 may be coupled to the camera 222 such that the field of view of the at least one distance sensor 236 tracks the field of view of the camera 222. The line of sight 225 of the camera 222 may be considered to be obstructed if the distance to the nearest object within the field of view of the at least one distance sensor 236 is less than a predetermined threshold distance.

The at least one distance sensor 236 may be an active sensor that transmits some type of energy, receives a portion of the energy reflected from one or more objects, and determines the distance to the objects from a difference between the transmitted and received energy. For example, the at least one distance sensor 236 may be a time-of-flight sensor that emits pulses of optical, acoustic, ultrasonic, or radio frequency (RF) energy and determines the distance to objects from the elapsed time required for the emitted energy pulses to reflect from the objects and return to the sensor 236. The at least one distance sensor 236 may be some other type of distance sensor configured to provide data indicative of a distance from the stereographic camera 222 to a nearest object.

For further example, the obstruction detector may be or include one or more pressure-sensitive floor mats 237 configured to detect the weight of persons standing or walking in front of the camera. The obstruction detector may include a combination of distance sensors, pressure sensitive mats, and other devices for detecting people and objects that obstruct the field of view of the camera 222 when the camera 222 is in the down position.

The distance sensors 236, floor mats 237, and other obstruction detection devices may provide data to a controller (not shown in FIG. 2). When the controller determines, from the data received from the obstruction detectors, that the line of sight 225 of the camera 222 in the down position may be obstructed, the controller may automatically cause the elevator 234 to raise the camera 222 to the up position as shown in FIG. 2B.

Figure 3:
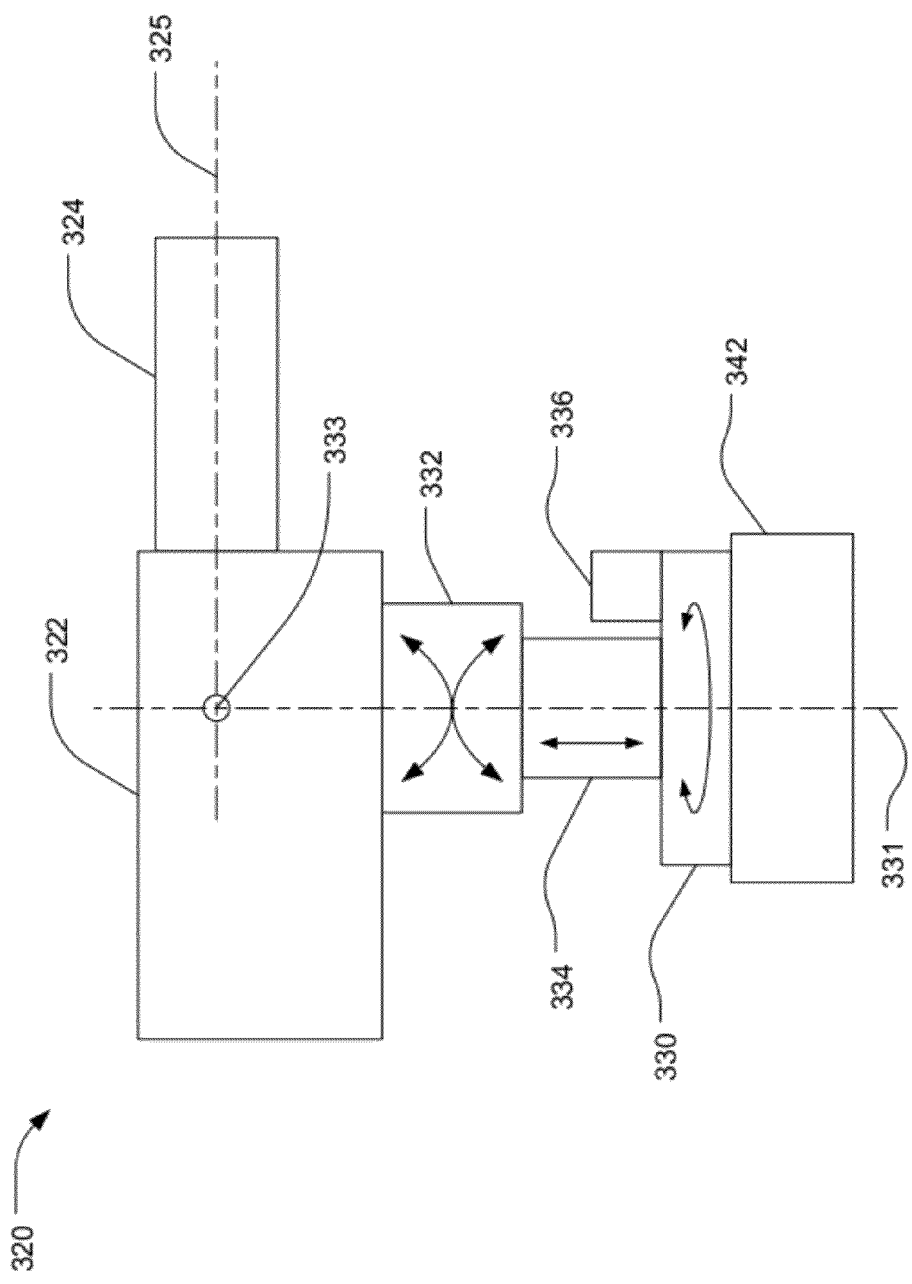
FIG. 3 is a schematic side view of a single seat-kill camera.

Referring now to FIG. 3, a single seat-kill camera 320 may include a camera head 322 with an associated lens 324, a plurality of mechanisms (330, 332, 334) for positioning the camera head and directing a line of sight 325 of the camera, and a support structure 342. The single seat-kill camera 320 may include a pan mechanism 330 for rotating the line of sight 325 about a generally vertical rotation axis 331. The rotation axis 331 of the pan mechanism may intersect the line of sight 325. The single seat-kill camera 320 may include a tilt mechanism 332 for rotating the line of sight 325 about a generally horizontal rotation axis. The rotation axis of the tilt mechanism may be orthogonal to the rotation axis 331 of the pan mechanism. The tilt mechanism 332 may rotate the line of sight 325 about a virtual axis 333 external to the tilt mechanism. The virtual axis 333 may intersect the line of sight 325.

The single seat-kill camera 320 may include an elevator 334 configured to shift the position of the camera head 322 vertically between at least a down position and an up position. The elevator may be a linear motion mechanism such as a linear motion stage. The elevator 334 may be driven between the down and up positions by a hydraulic cylinder, a pneumatic cylinder, a solenoid, and/or a linear motor within or coupled to the linear motion stage. The elevator 334 may be driven between the down and up positions by a rotary motor coupled to the linear motion stage by one or more belts, chains, gears, screws, or other mechanical components. The elevator 334 may be another mechanism configured to move the camera 322 between the down and up positions.

Although not shown in FIG. 3, the supporting structure 342 may be a tripod, a stand, a pedestal, a dolly, or another structure. The supporting structure may be configured such that, when the elevator is in the down position, the camera head 322 may be supported at a height approximately equivalent to the head position of a seated spectator. When the elevator 334 is in the up position, the camera head 322 may be supported at a height approximately equivalent to the head position of a standing spectator. The distance of travel of the elevator 334 may be about the same as the height difference between a seated and standing spectator.

The average standing height of an American male is about 69.4 inches (U.S. Department of Health and Human Services, National Health Statistics Reports, No. 10, Oct. 22, 2008). The standing height of 90% of American males is less than 73.2 inches. The average standing height of an American female is about 63.8 inches The average ratio of seated height to standing height is about 52%, but may range from 50% to 55%. Thus the average seated height of an American male may be about 36 inches and the average difference between the sitting height and standing height may be about 33 inches.

The elevator 334 and/or the support structure 342 may be configured to allow the height of the camera head 322 in the down position to be adjusted in consideration of the seated heights of spectators in front of the camera 320. For example, the elevator 334 and/or the support structure 342 may be configured such that the height of the camera in the down position may be set to a value from about 32 inches to about 40 inches. The elevator 334 and/or the support structure 342 may be configured to allow the height of the camera head 322 in the up position to be adjusted in consideration of the seated heights of spectators in front of the camera 320. For example, the elevator 334 and/or the support structure 342 may be configured such that the height of the camera in the up position may be set to a value from about 64 inches to about 73 inches.

The elevator 334 may also be configured to allow the range of motion of the camera head 322 between the down and up positions to be adjusted in consideration of the seated and standing heights of spectators in front of the camera 320. For example, the elevator 334 may be configured such that the distance traveled between the down and up positions may be set to a value from about 30 inches to about 36 inches.

The single seat-kill camera 320 may include an obstruction detector 336 to detect whether or not a field of view of the camera may be obstructed if the camera head 322 was in the down position. The obstruction detector 336 may be, for example, mounted to the pan mechanism 330 such that, as the pan mechanism 330 rotates the line of sight 325 of the camera, the obstruction detector 336 rotates about the pan mechanism axis 331 in synchronism such that a field of view of the obstruction detector 336 is aligned with the line of sight 325.

Figure 4:
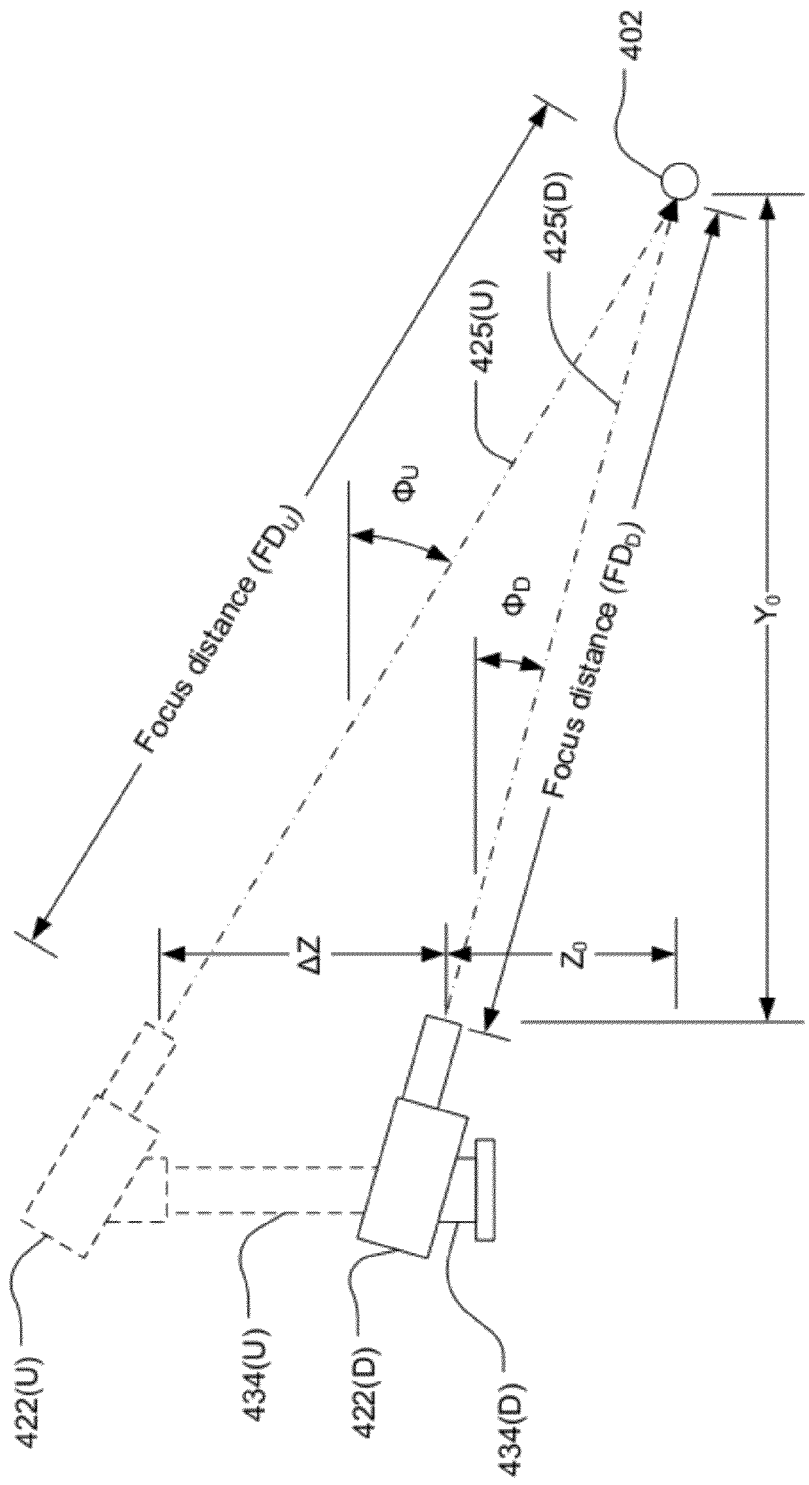
FIG. 4 is a schematic side view of a single seat-kill camera illustrating geometric compensation of the camera line-of-sight.

Referring now to FIG. 4, a camera 422, which may be the camera 222 or 322, is shown in a down (D) position (in solid lines) and in an up (U) position (in dashed lines). To move between the down and up positions, the camera 422 may translate vertically by a distance $\Delta Z$. The distance $\Delta Z$ may be, for example from about 30 inches to about 36 inches. An elevator 434, also shown in a down position (D) and an up (U) position, may be used to translate the camera between the down and up positions.

In the example of FIG. 4, the line of sight 425 of the camera 422 in the down position is directed to a scene object 402 such that the scene object 402 is in the center of the field of view of the camera 422. The position of the scene object 402 with respect to the camera 422 may be defined by a focus distance $FD_D$ of the camera lens and a tilt angle $\Phi_D$. If the tilt angle $\Phi_D$ is held constant as the camera is moved between the down and up positions, the line of sight 425 of the camera will move vertically by a corresponding distance such that the scene object 402 will no longer be in the center of the camera's field of view.

To maintain the scene object 402 at the center of the camera field of view, the tilt angle $\Phi$ of the camera 422 may be varied to compensate for the camera motion between the down position and the up position. The position of the scene object 402 with respect to the camera 422 may be determined by the formulas:

$$Z_0 = FD_D \sin(\Phi_D) \quad (1)$$

$$Y_0 = FD_D \cos(\Phi_D), \quad (2)$$

where $Y_0$, $Z_0$=position of the scene object in rectangular coordinates;

$FD_D$=focus distance of the camera lens with the camera in the down position;

$\Phi_D$=tilt angle of the camera in the down position.

The tilt angle required to direct the line of sight 425 of the camera in the up position to the scene object 402 (such that the scene object 402 remains at the center of the camera field of view when the camera is raised to the up position) may be determined by the formula:

$$\Phi_U = \tan^{-1}\left(\frac{\Delta Z + Z_0}{Y_0}\right) \quad (3)$$

where $\Phi_U$=required tilt angle for the camera in the up position.

In some situations, for example when the scene object 402 is very close to the camera 422, the focus distance of the camera lens may also be varied to compensate for the camera motion between the down and up positions, in accordance with the formula:

$$FD_U = \sqrt{Y_0^2 + (\Delta Z + Z_0)^2} \quad (4)$$

where $FD_U$=required focus distance for the camera in the up position.

The tilt angle of the camera may be adjusted in synchronism with the vertical motion of the camera such that field of view of the camera 422 remains essentially fixed before, during, and after the camera moves between the up and down positions. The field of view may be considered to be essentially fixed if the apparent movement of the primary scene object 402 within the field of view due to the camera moving between the up and down positions is small compared to the extent of the primary scene object. When required, the focus distance of the camera lens may also be adjusted in synchronism with the vertical motion of the camera such that the scene object 402 remains in focus before, during, and after the camera moves between the up and down positions.

Figure 5:
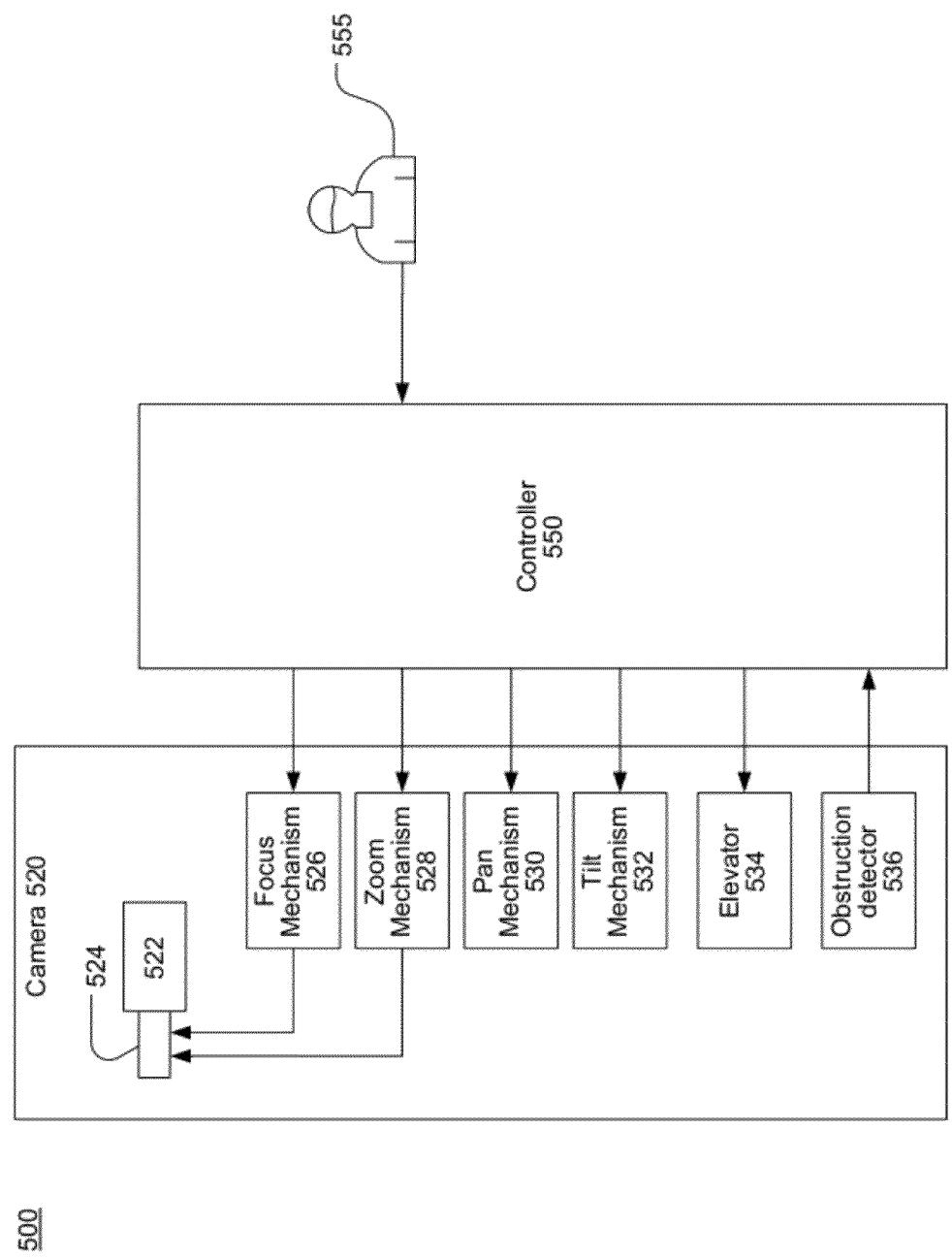
FIG. 5 is a block diagram of a single seat-kill camera system.

Referring now to FIG. 5, a 2D (non-stereoscopic) single seat-kill camera system 500 may include a camera 520 coupled to a controller 550. The camera 520 may include a camera head 522, a lens 524, and a plurality of mechanisms to set operating parameters of the camera 520. The plurality of mechanisms may allow the camera 520 to be remotely controlled via the controller 550. For example, the camera 520 may be remotely controlled by one or more operators 555.

The camera 520 may include a focus mechanism 526 and a zoom mechanism 528 for setting a focus distance and a focal length, respectively, of the lens 524 in response to data received from the controller 550. The focus distance of the lens 522 may be controlled by an auto-focus system (not shown) within the camera 520.

The camera 520 may include a pan mechanism 530 and a tilt mechanism 532 to adjust and set the pan (azimuth) and tilt (elevation) pointing angles of the camera head 522. The pan mechanism 530 and the tilt mechanism 532 may each include a motor or other actuator adapted to set the pan and tilt angles, respectively, in response to data received from the controller 550.

The camera 520 may include an elevator 534 configured to move the camera head 522 approximately vertically between an up position and a down position in response to data received from the controller 550.

The camera 520 may include an obstruction detector 536 to detect whether or not a field of view of the camera head 522 will be obstructed when the camera head 522 is in the down position. The obstruction detector may provide data to the controller 550 indicating in the field of view may be obstructed. The obstruction detector 536 may be or include one or more distance sensors, one or more weight sensors, or other devices.

The controller 550 may be, in whole or in part, incorporated within the camera 520 or may be separate from the camera 520. The controller 550 may be coupled to the camera 520 via a network which may be a local area network; via one or more buses such as a USB bus, a PCI bus, a PCI Express bus, or other parallel or serial data bus; or via one or more direct wired or wireless connections. The controller 550 may be coupled to the camera 520 via a combination of one or more of direct connections, network connections, and bus connections. The connections between the controller 550 and the camera 520 may be wired, fiber optic, or wireless.

The controller 550 may receive data from one or more operators 555 indicating operating parameters for the camera 520. The one or more operators 555 may include, for example, a camera man, an assistant camera man, and/or a video engineer. The controller 550 may receive data from the one or more operators 555 instructing the controller to set operating parameters for the camera 520 including lens focus distance and focal length and pan and tilt angles. In response to instructions received from the one or more operators 555, the controller 550 may send data to the camera 520 instructing the respective mechanisms 526, 528, 530, 532 to set the camera parameters accordingly.

The one or more operators 555 may be dedicated to remotely operating the camera 520. The one or more operators 555 may be physically operating a second camera (not shown), in which case the controller 550 may be configured to cause the operating parameters of the camera 520 to track the operating parameters of the second camera such that both cameras capture the same portion of a scene. Techniques for operating a camera based on the operation of a master camera are described, for example, in U.S. Pat. No. 7,193,645 B1.

The controller 550 may cause the elevator to position the camera head 522 in the down position unless the controller 550 receives data from the obstruction detector 536 indicating that the field of view of the camera 520 in the down position may be obstructed. When the controller 550 receives data from the obstruction detector 536 indicating that the field of view of the camera in the down position may be obstructed, the controller 550 may automatically cause the elevator 536 to move the camera head 522 to the up position. When the controller 550 receives data from the obstruction detector 536 indicating that the field of view of the camera 520 in the down position is no longer obstructed, the controller 550 may automatically cause the elevator 536 to return the camera head 522 to the down position.

The controller 550 may also automatically send data to the tilt mechanism 532 to compensate the tilt angle of the camera head 522 such that the field of view of the camera 520 does not significantly change as the camera head 522 moves between the down and up positions. When required, the controller 550 may also automatically send data to the focus mechanism 526 to ensure that the image being captured remains in focus as the camera head 522 moves between the down and up positions.

Figure 6:
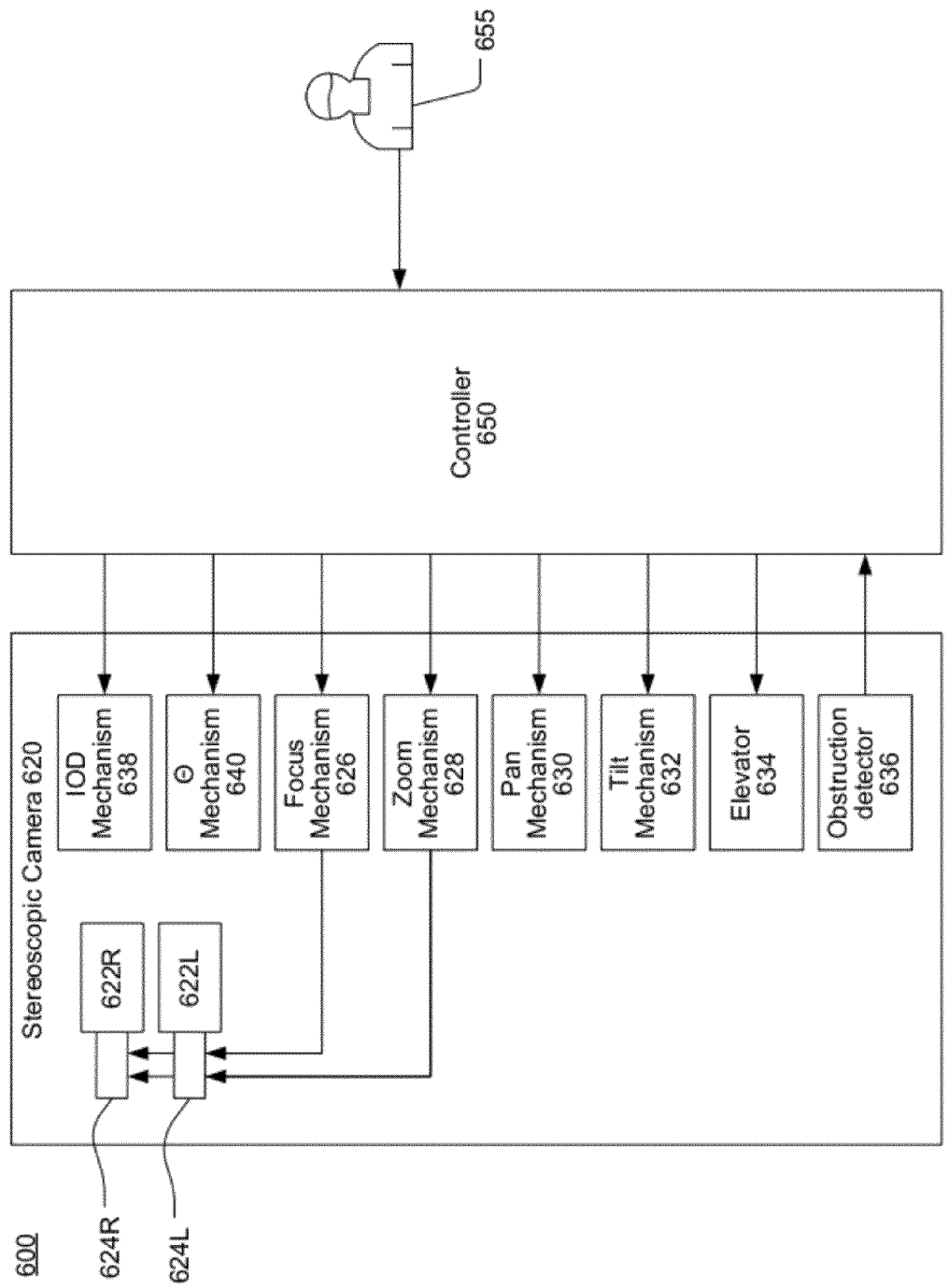
FIG. 6 is a block diagram of a stereographic single seat-kill camera system.

Referring now to FIG. 6, a stereoscopic single seat-kill camera system 600 may include a stereographic camera 620 coupled to a controller 650. The stereographic camera 620 may include left and right camera heads 622L, 622R having associated lenses 624L, 624R, and a plurality of mechanisms to set operating parameters of the stereographic camera 620. The stereographic camera 620 may includes a pan mechanism 630, a tilt mechanism 632, and elevator 634, and an obstruction detector 636 which are essentially the same as the counterpart elements of the camera system 500. The stereographic camera 620 may include a focus mechanism 626 and a zoom mechanism 628 which are essentially the same as the counterpart elements of the camera system 500, with the exception that the focus mechanism 626 and the zoom mechanism 628 of the stereographic camera 620 adjust the focus distance and focal length, respectively, of both lenses 624L, 624R.

The stereographic camera 620 may include an IOD mechanism 638 to adjust an interocular distance between the left camera head 622L and the right camera head 622R. The stereographic camera 620 may include a Θ mechanism 640 to adjust a stereo convergence angle between the left camera head 622L and the right camera head 622R by pivoting one or both camera heads about respective pivot axes. The IOD mechanism 638, and the Θ mechanism 640 may include one or more movable platforms or stages coupled to motors or other actuators. The IOD mechanism 638, and the Θ mechanism 640 may be adapted to set the interocular distance and the stereo convergence angle, respectively, in response to data received from the controller 650.

The controller 650 may perform the functions and operations of the controller 550. Additionally, the controller 650 may also receive data from one or more operators 655 indicating stereographic parameters for the stereographic camera 620. In this context, "stereographic parameters" are operating parameters unique to stereographic cameras. For example, the controller 650 may receive data from the one or more operators 655 indicating a focus distance to convergence distance offset. The controller 650 may also receive data from the one or more operators 655 indicating a desired interocular distance between the camera heads 622L, 622R. Alternatively, the controller may automatically calculate a desired interocular distance based on the focus distance and focal length of the lenses 624L, 624R and scene characteristics. For example, the controller 650 may automatically calculate the desired interocular distance as described in copending patent application Ser. No. 12/578,488, entitled Stereo Camera With Automatic Control of Interocular Distance. In either case, the controller 650 may determine the required interocular distance IOD and convergence angle Θ and send data indicating the interocular distance and convergence angle to the stereographic camera 610.

Figure 7:
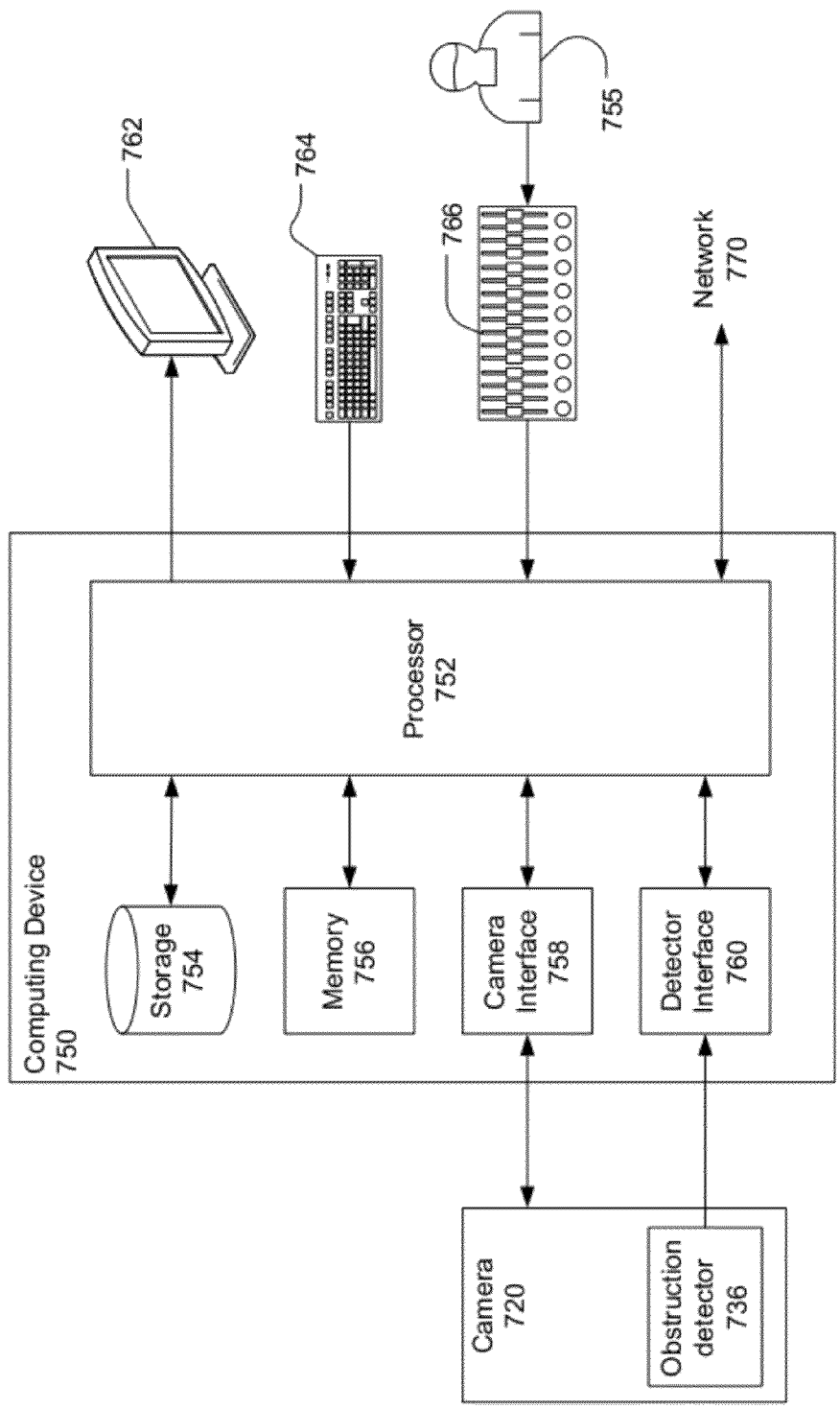
FIG. 7 is a block diagram of a computing device.

FIG. 7 is a block diagram of a computing device 750 that may be suitable for the controller 550 or 650. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 750 may include hardware, firmware, and/or software hosted on hardware and/or firmware adapted to perform the processes subsequently described herein. The computing device 750 may include a processor 752 coupled to a memory 756 and a storage device 754.

The storage device 754 may store instructions which, when executed by the processor 752, cause the computing device to provide the features and functionality of the controller 550 or 650. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 750 may include or interface with a display device 762 and one or more input devices such a keyboard 764. The computing device 750 may include or interface with a camera operator interface 766, by which one or more camera operators 755 may control, at least in part, the operation of one or more cameras. For example, the camera operator interface 766 may be adapted to allow the one or more camera operators 755 to control camera operating parameters including some or all of a pan angle, a tilt angle, a focus distance, a lens focal length, a lens aperture, and other operating parameters. When the computing device 750 is used to control a stereographic camera, the camera operator interface 766 may be adapted to allow the one or more camera operators 755 to control stereographic parameters such as a focus distance to convergence distance offset, a maximum allowable disparity, and/or an interocular distance.

The computing device 750 may also include an interface with one or more networks 770. The computing device 750 may interface with the network 770 via a wired or wireless connection. The network 770 may be the Internet or any other private or public network.

The computing device 750 may also include a camera interface unit 758 to interface with a camera 720. The camera interface unit 758 may include a combination of circuits, firmware, and software to interface with a camera 720. The camera interface unit 758 may be coupled to the camera 720 via a network which may be a local area network; via one or more buses such as a USB bus, a PCI bus, a PCI Express bus, or other parallel or serial data bus; or via one or more direct wired or wireless connections. The camera interface unit 758 may be coupled to the camera 720 via a combination of one or more of direct connections, network connections, and bus connections.

The computing device 750 may also include a detector interface unit 760 to interface with an obstruction detector 736. The detector interface unit 760 may include a combination of circuits, firmware, and software to interface with the obstruction detector 736. For example, the computing device 750 may receive data indicative of a distance to a closest object from the obstruction detector 736. Alternatively, the computing device may receive data from floor sensors indicating positions of standing spectators. The computing device 750 may process the data received from the obstruction detector 736 to determine if the view of view of the camera 720 may be obstructed. When the computing device 750 determines that the field of view of the camera 720 may be obstructed, the computing device 750 may automatically send data to the camera 720 via the camera interface unit 758 to cause the camera to move vertically to an "up" position. The detector interface unit 760 may be coupled to the obstruction detector 736 via a network which may be a local area network; via one or more buses such as a USB bus, a PCI bus, a PCI Express bus, or other parallel or serial data bus; or via one or more direct wired or wireless connections.

The processes, functionality and features of the computing device 750 may be embodied in whole or in part in software executed by the processor 752. The software may be in the form of firmware, an application program, an applet (e.g., a Java applet), a browser plug-in, a COM object, a dynamic linked library (DLL), a script, one or more subroutines, or an operating system component or service. The computing device 750 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 752 and others by other devices.

Description of Processes

Figure 8:
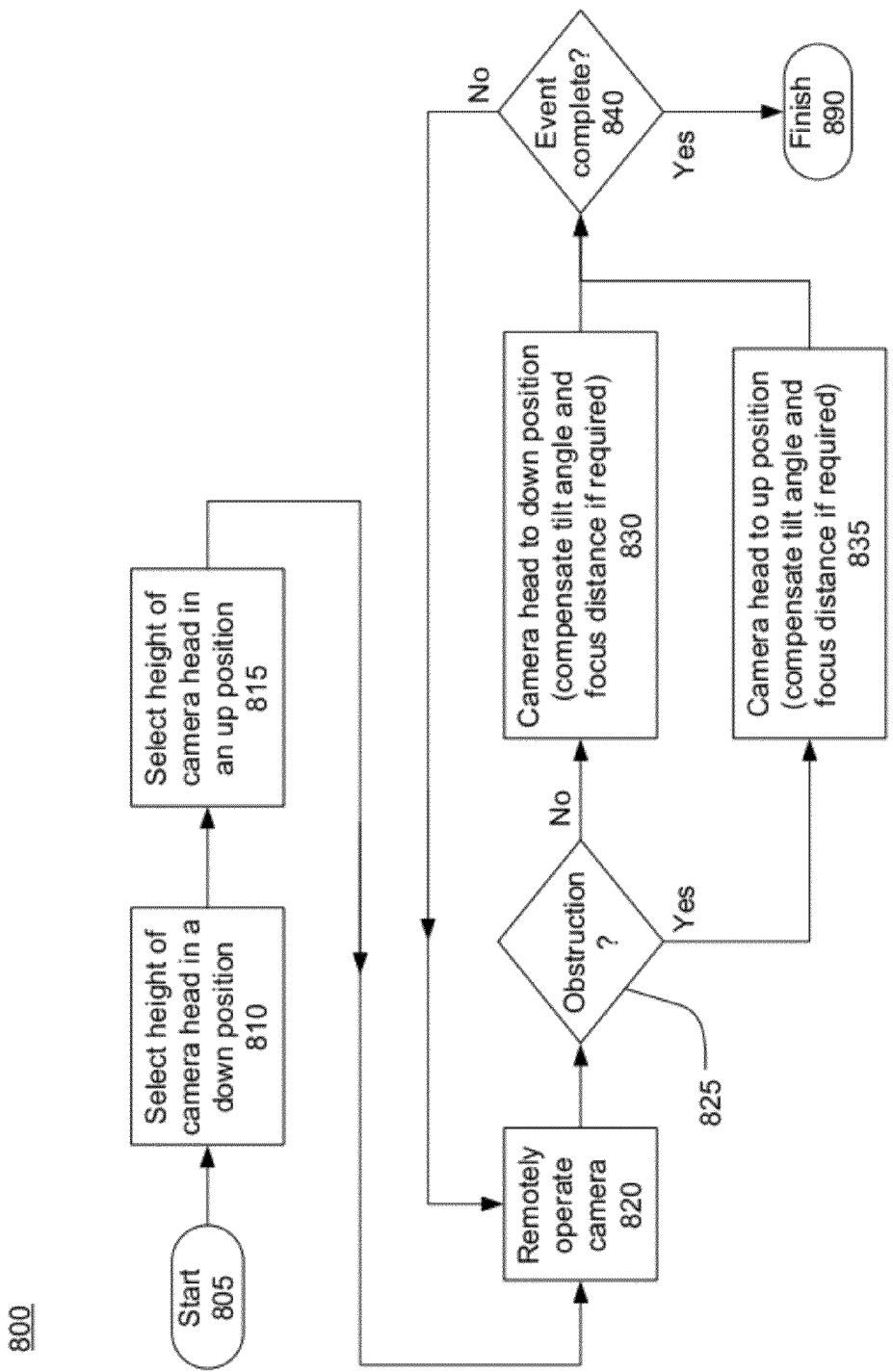
FIG. 8 is a flow chart of a method for operating a camera.

FIG. 8 is a flow chart of an exemplary process 800 for capturing images using a single seat-kill camera system such as the camera systems 500 and 600. The flow chart of FIG. 8 has a start 805 and a finish at 890 when the recording of the event is complete. The process 800 is cyclic and continuous in nature, and the actions 820-840 may be repeated continuously and in near-real time during the recording of each scene or event. Within this patent, the phrase "near-real time" means in real time except for processing delays that are very short compared with temporal events in the scene being recorded.

The single seat-kill camera system may include an elevator to move a camera head approximately vertically between an up position and a down position. When the camera head is in the down position, the single seat-kill camera system may have about the same overall height as a seated spectator. When the camera head is in the up position, the single seat-kill camera system may have about the same overall height as a standing spectator. The vertical height of the camera head in the up position and in the down position may be adjustable and selectable.

At 810, a height of the camera head in the down position may be selected based on the seated height of spectators in front of the camera. The height of the camera head may be selected, for example, to be the minimum height that provides the camera with an unobstructed or only slightly obstructed line of sight over the heads of the seated spectators over the field of regard. Similarly, at 815 a height of the camera head in the up position may be selected based on the standing height of spectators in front of the camera. The height of the camera head may be selected, for example, to be the minimum height that provides the camera with an unobstructed or only slightly obstructed line of sight over the heads of the standing spectators over the field of regard. The actions at 810 and 815 may be performed once prior to the start of capturing an event, or may be performed as needed if the spectators in front of the camera change during the event.

At 820, the single seat-kill camera may be remotely operated to capture an image of an event. Remotely operating the camera may include, for example, setting pan and tilt angles such that a camera head is pointed toward a primary object to be captured, setting a lens focus distance such that the camera lens or lenses are focused upon or near a primary object, and setting a focal length of the lens or lenses to define a pleasing image frame around the primary object. The single seat-kill camera may be remotely operated by one or more operators. For example, when capturing live events such as sporting events, the single seat-kill camera may be operated by a single cameraman. When the single seat-kill camera is a stereographic camera, a cameraman may control the pan and tilt angles of the camera head and the lens focus distance and focal length, and another operator, such as a recording engineer, may control other parameters of the stereographic camera such as interocular distance and focus distance to convergence distance offset.

The single seat-kill camera may include an automatic focus subsystem that set the focus distance of the lenses. An automatic focus subsystem may set the lens focus distance based on a sensor that measures the distance to a specific object with an image frame (typically the object in the center of the image). An automatic focus subsystem may set the lens focus distance by varying or dithering the lens focus distance while analyzing a selected portion of the image frame captured by the stereographic camera. The selected portion of the image frame may be set by an operator or may be determined automatically (for example by recognizing faces within the image frame)

At 825, obstructions to the line of sight or field of view (FOV) of the camera in the down position may be detected. For example, obstructions may be detected by measuring distances to close objects within the camera field of view or by measuring the weight of standing spectators within the field of view, or by other methods and combinations thereof.

When an obstruction is not detected at 825, the position of camera head may be set to the down position at 830. If the camera head has previously been in the down position, no action occurs at 830. If the camera head had previously been in the up position, at 830 the elevator may move the camera head from the up position to the down position, and the tilt angle of the camera head and the focus distance of the camera lens may be synchronously compensated as described in conjunction with FIG. 4.

When an obstruction is detected at 825, the position of camera head may be set to the up position at 835. If the camera head has previously been in the up position, no action occurs at 835. If the camera head had previously in the down position, at 835 the elevator may move the camera head from the down position to the up position, and the tilt angle of the camera head and the focus distance of the camera lens may be synchronously compensated as described in conjunction with FIG. 4.

After the camera head position is set at either 830 or 835, the process 800 may continue at 840, where a determination may be made if the recording of the event has been completed. When the event has not been completed, the process 800 may repeat from 820. The actions from 820 to 840 may be performed continuously and essentially simultaneously until the scene or event is completed. When the scene or event has been completed, the process 800 may finish at 890.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A single seat-kill camera, comprising:
    a camera head
    a support structure
    an elevator coupled to the camera head and the support structure, the elevator configured to move the camera head relative to the support structure to position the camera head in one of a down position and an up position
    an obstruction sensor to determine whether or not a field of view of the camera head is obstructed, at least in part, when the camera head is in the down position, wherein the obstruction sensor comprises one or more pressure-sensitive floor mat configured to sense the weight of a person standing or walking in front of the single seat kill camera
    a controller coupled to the elevator and the obstruction detector
    wherein the controller automatically instructs the elevator to position the camera head in the up position when the obstruction sensor determines that the field of view of the camera head in the down position is obstructed.

2. The single seat-kill camera of claim 1, wherein
    a height of the camera head in the down position is about 32 to 40 inches
    a height of the camera head in the up position is about 64 to 73 inches.

3. The single seat-kill camera of claim 1, wherein
    a height of the camera head in the down position is selectable within a range of about 32 to 40 inches
    a height of the camera head in the up position is selectable within a range of about 64 to 73 inches.

4. The single seat-kill camera of claim 1, further comprising:
    a tilt mechanism coupled to the controller, the tilt mechanism to set a tilt angle of the camera head in accordance with data received from the controller.

5. The single seat-kill camera of claim 4, wherein
    when the camera head is moved between the down and up positions, the controller automatically sends data to the tilt mechanism to change the tilt angle to compensate for the change in the position of the camera head.

6. The single seat-kill camera of claim 5, wherein
    the controller automatically sends data to the tilt mechanism to change the tilt angle in synchronism with the movement of the camera head between the up and down positions such that a field of view of the camera remains essentially fixed.

7. The single seat-kill camera of claim 4, further comprising:
    a pan mechanism set a pan angle of the camera head in accordance with data received from the controller
    a focus distance mechanism and a focal length mechanism to respectively set a focus distance and a focal length of one or more lenses associated with the camera head in accordance with data received from the controller
    wherein the controller provides data to the tilt, pan, focus distance and focal length mechanisms in response to instructions received from one or more remote operators.

8. The single seat-kill camera of claim 7, further comprising:
    an interocular distance mechanism and a convergence angle mechanism to respectively set an interocular distance and a convergence angle associated with the camera head in accordance with data received from the controller
    wherein the controller provides data to the interocular distance and convergence angle mechanisms in response to instructions received from one or more remote operators.

9. The single seat-kill camera of claim 1, wherein the camera is either a stereographic camera system or a 2D camera.

10. The single seat-kill camera of claim 1, wherein the controller automatically instructs the elevator to move the camera head from the up position to the down position when the obstruction sensor determines that the field of view of the camera head in the down position is no longer obstructed.

11. A method for operating a camera including a camera head and a support structure, comprising:
- an obstruction sensor automatically determining whether or not a field of view of the camera head is obstructed, at least in part, when the camera head is in a down position by sensing the weight of a person standing or walking in front of the camera using one or more pressure-sensitive floor mat
- automatically moving the camera head relative to the support structure to an up position higher than the down position when the sensing determines the field of view of the camera head in the down position is obstructed.

12. The method for operating a camera of claim 11, further comprising:
- selecting a height of the camera head in the down position based on the seated heights of spectators in front of the camera.

13. The method for operating a camera of claim 12, wherein
- the height of the camera head in the down position is selected within a range of about 32 to 40 inches.

14. The method for operating a camera of claim 12, further comprising:
- selecting a height of the camera head in the up position based on the standing heights of spectators in front of the camera.

15. The method for operating a camera of claim 14, wherein
- the height of the camera head in the up position is selectable within a range of about 64 to 73 inches.

16. The method for operating a camera of claim 14, further comprising:
- when the camera head is moved between the down and up positions, automatically adjusting a tilt angle of the camera head to compensate for the change in the position of the camera head.

17. The method for operating a camera of claim 16, wherein
- when the camera head is moved between the down and up positions, the camera position and the tilt angle are adjusted synchronously such that a field of view of the camera remains essentially fixed.

18. The method for operating a camera of claim 16, further comprising:
- remotely controlling in part the tilt angle of the camera head and remotely controlling a pan angle of the camera head and a focus distance and a focal length of one or more lenses associated with the camera head.

19. The method for operating a camera of claim 16, further comprising:
- remotely controlling an interocular distance and a convergence angle associated with the camera head.

20. The method for operating a camera of claim 11, further comprising moving the camera head from the up position to the down position when the obstruction sensor determines that the field of view of the camera head in the down position is no longer obstructed.

* * * * *